(No Model.)

H. W. GETMAN.
HORSE RAKE.

No. 298,966. Patented May 20, 1884.

WITNESSES
W. E. Bowen
Chas. R. Burr

INVENTOR
Henry W. Getman
By Myers & Co
Attorneys (No Model.) 3 Sheets—Sheet 2.
H. W. GETMAN.
HORSE RAKE.
No. 298,966. Fig. 3. Patented May 20, 1884.
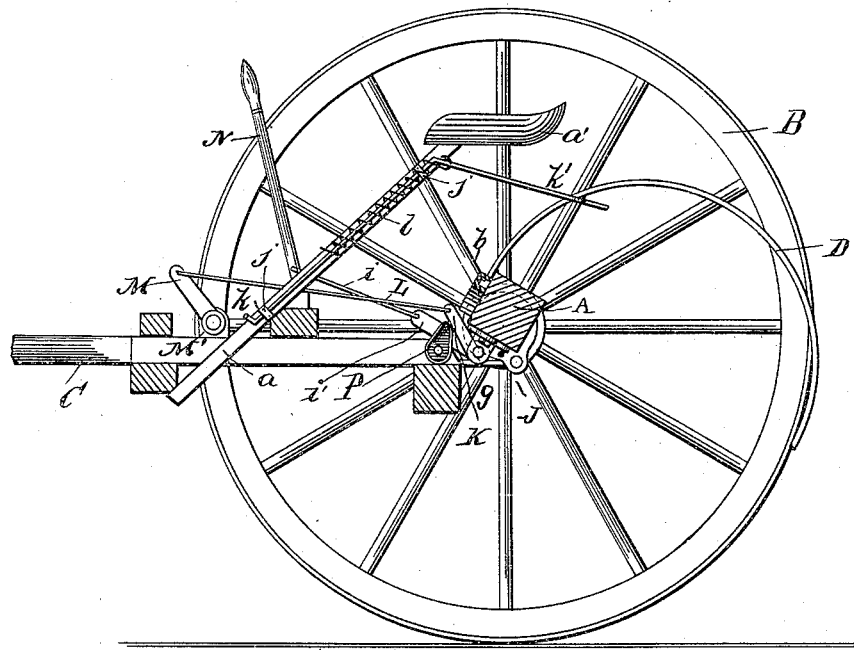
Fig. 4
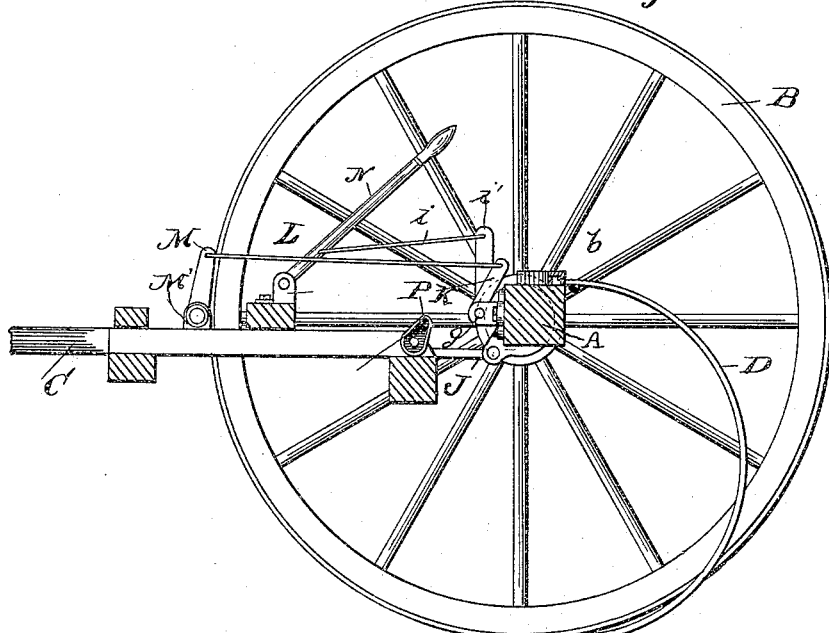
WITNESSES
Chas. R. Burr
J. Asta McGill
INVENTOR
Henry W. Getman
By Myers & Co.
Attorneys (No Model.) 3 Sheets—Sheet 3.
H. W. GETMAN.
HORSE RAKE.
No. 298,966. Patented May 20, 1884.
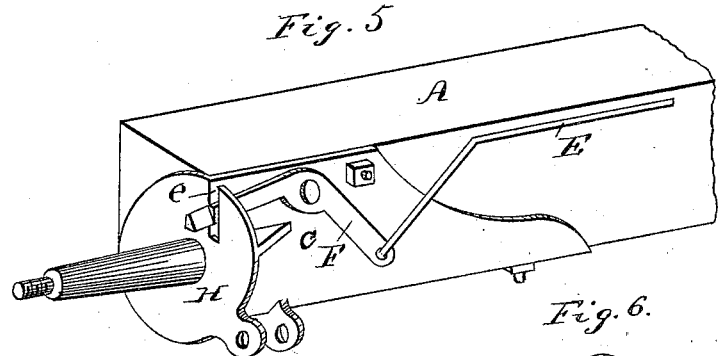
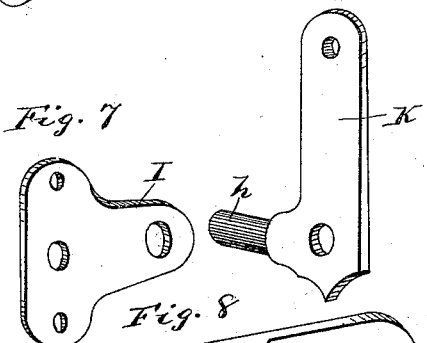
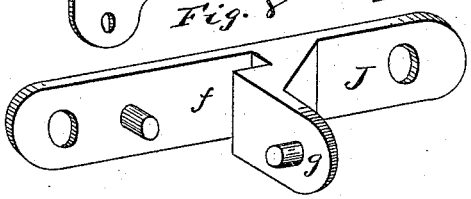
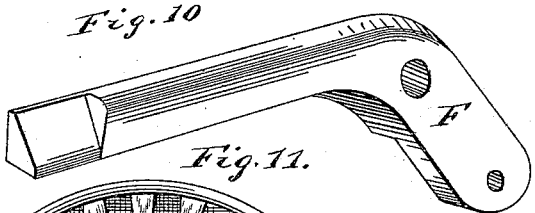
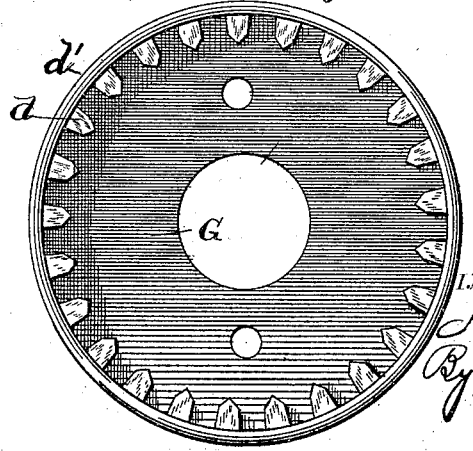
WITNESSES
Chas. R. Burr
J. Nota McGill
INVENTOR
H. W. Getman
By Myers & Co.
Attorneys.

United States Patent Office.

HENRY W. GETMAN, OF ILION, NEW YORK.

HORSE-RAKE.

SPECIFICATION forming part of Letters Patent No. 298,966, dated May 20, 1884.

Application filed October 8, 1883. (No model.)

*To all whom it may concern:*

Be it known that I, H. W. GETMAN, a citizen of the United States of America, residing at Ilion, in the county of Herkimer and State of New York, have invented certain new and useful Improvements in Horse Hay-Rakes, of which the following is a specification, reference being had therein to the accompanying drawings.

My invention pertains to improvements in horse hay-rakes, having for its object to effect the raking of the hay so as to prevent the latter being pushed into the path of the wheels, to enable the ready manipulation of the rake in elevating, dumping, and lowering of the same, and to readily secure or retain the rake-teeth in an elevated position during the turning or transporting of the machine about the field from place to place.

To these ends my invention consists of the disposition of the rake-teeth so that their points collectively will form a curve, commencing with the teeth adjacent to the wheels and extending rearward to central teeth; secondly, of the detailed construction of the appliances for operating the rake-teeth, and of a contrivance to secure or retain the latter in an elevated position, substantially as hereinafter more fully set forth and claimed.

Figure 1:
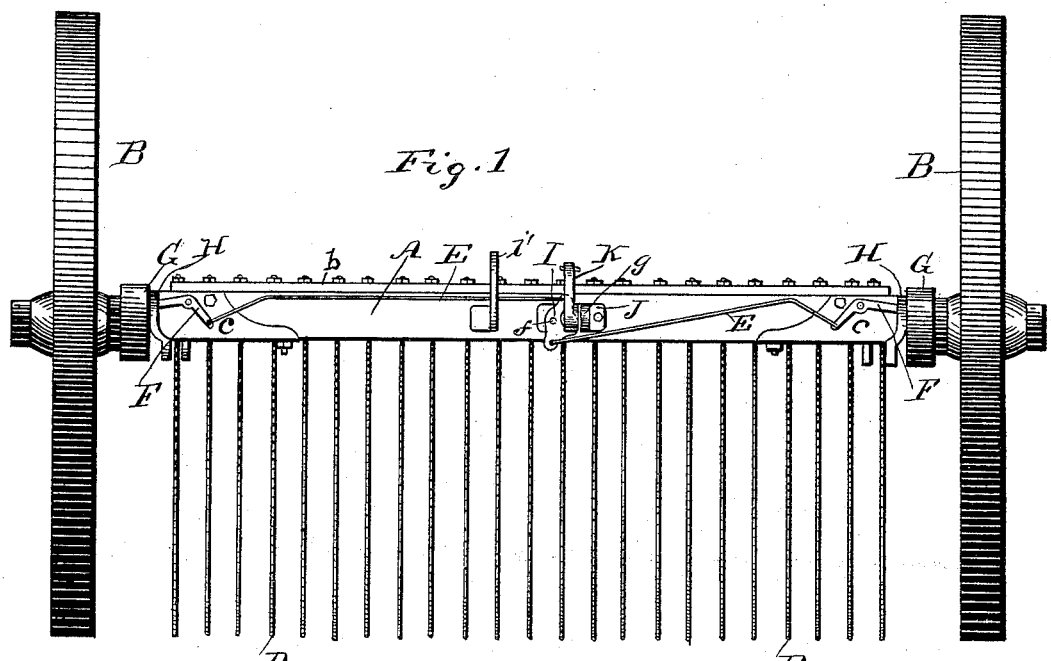
Figure 2:
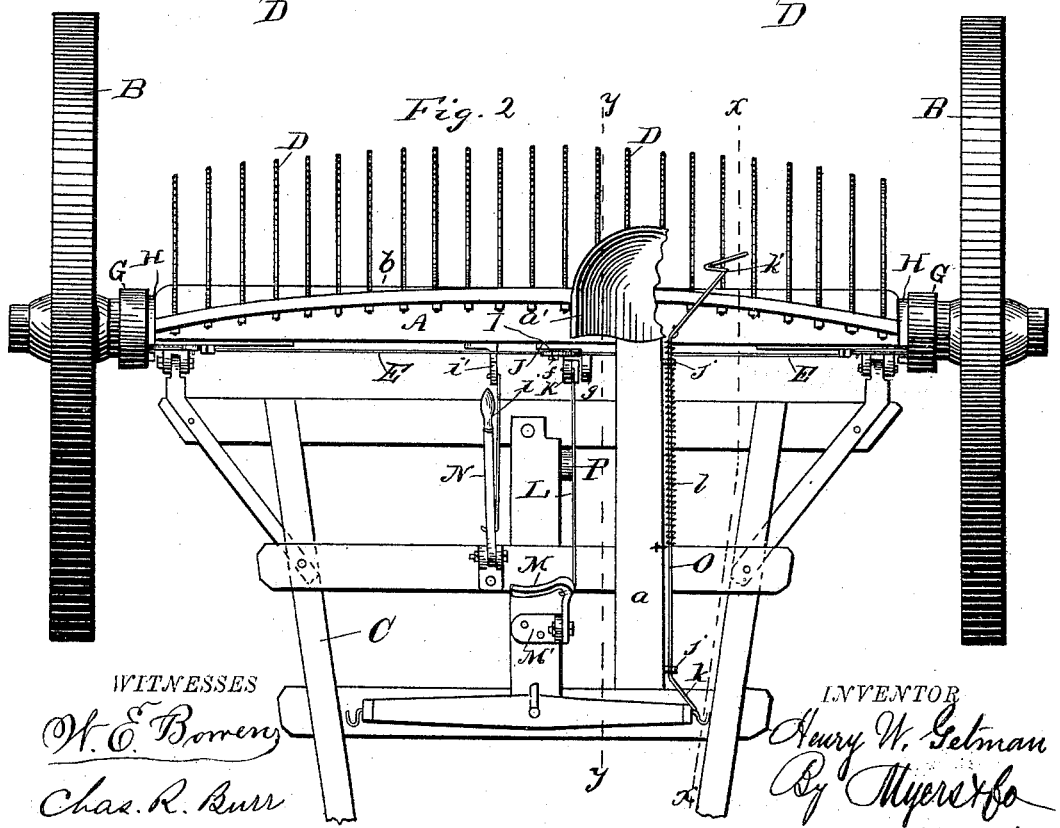

Figure 1 is a front view of my rake, certain parts thereof being removed to more clearly illustrate those shown. Fig. 2 is a plan view thereof. Fig. 3 is a cross-section on the line $x\,x$, Fig. 2, showing the rake in its elevated position. Fig. 4 is a cross-section on line $y\,y$, Fig. 2, showing the rake lowered. Figs. 5, 6, 7, 8, 9, and 10 are detailed perspective views of my improvement. Fig. 11 is an inner face view of one of the ratchet-wheels.

In the organization of my invention I employ an axle, A, provided with the usual transporting-wheels, B B. To the axle A are connected thills C, upon cross-bars of which is mounted by a standard, $a$, the driver's seat $a'$.

D D are the rake-teeth, suitably curved, and having their upper ends covered by an inverted box, $b$, bolted or fastened upon the upper side of the axle in the line of a shallow curve, the ends of said curve being at the ends of the axle, near the front side thereof, while its convexity is at the center of the rear edge of the axle, whereby the points or lower ends of the teeth are arranged in a curved line, so as to not be liable to push or scatter the hay in the path of the wheels.

E E are rods formed with angles or bends near their outer ends, which act as springs, and arranged upon the front side of the axle (which is also the rake-head) so as to be capable of a sliding movement, the outer ends of said rods being connected to the inner ends of lever-pawls F F, pivoted to the axle or rake head, or rather upon plates $c\,c$, fastened to the axle or head. The connection of the inner ends of the rods E will be referred to further on.

G G are ratchet-wheels, one fastened to the inner end of each wheel-hub, and having an inwardly-projecting rim, $d'$, provided with a series of teeth, $d$, with their points beveled off, as shown in Fig. 11, in order the better to engage with the teeth. The lever-pawls are adapted to project through notches or slots $e$ in the peripheries of disks H, fastened to the shoulders of the axle inside of the wheel-hubs, their free ends being beveled and adapted to engage with the ratchet-teeth $d$. The inner ends of the rods E are connected to the opposite ends of a double bell-crank lever, I, centrally pivoted upon the pin $f$ of the bracket or casting J, fastened to the front side of the axle about at its middle.

K is a second lever, pivoted upon the stud or pin $g$ of the bracket J, and having a stud or projection, $h$, which enters an aperture in or is otherwise connected to the bell-crank lever I, the upper end of the lever K being connected by a rod, L, to the foot-lever M. The foot-lever M is pivoted to the bracket M', secured upon the thill-frame, and rod L forms a pivoted joint or connection between bracket M and lever K.

N is a hand-lever fulcrumed upon the thill-frame, and connected by a rod, $i$, to a bracket, $i'$, fixed to the axle, whereby the axle or rake-head is adapted to be partially revolved in the wheel-hubs, to allow the raising by hand of the rake.

O is a bent and upward inclined bar, supported in eyes or brackets $j$, secured to the seat-standard, said bar having its lower or front end provided with a foot-piece, $k$, while its upper or rear end has a rearwardly-projecting hook, $k'$, to take hold of a tooth of the rake, to enable the temporary supporting in an elevated position of the rake when it is desired to transfer the machine from place to place. Applied to this bar is a spring, I, adapted to turn said bar on its axis and elevate its rear arm sufficiently to be out of the way of the rake-teeth when they are elevated during the operation of the rake.

By applying pressure by the foot upon the foot-lever, when it is desired to dump the rake or deposit its load, the bent rods E will be so acted upon as to thrust the lever-pawls into engagement with the teeth $d$, connected to the wheel-hubs, whereby the axle or rake-head will be partially revolved, and thus elevate the rake so as to cause it to drop its contents, and immediately thereafter the lever K will be brought into contact with the stop P on the thill-frame, which trips said lever and retracts the lever-pawls from the ratchet-wheels of the wheel-hubs, when the rake will descend by its gravity to its original or lowered position to again rake up the hay.

Having thus fully described my invention, I claim and desire to secure by Letters Patent—

1. The combination of the rods E, pawls F, ratchet-wheels G, disks H, having slots $e$, double crank-lever I, bracket J, bell-crank lever K, rod L, and foot-lever M, pivoted on the bracket M', substantially as shown, and for the purpose described.

2. The combination of the rod O, secured by brackets $j$ to the seat-standard, and provided with the foot-piece $k$ and hook $k'$, the spring $l$, and rake-teeth D, substantially as shown, and for the purpose described.

In testimony whereof I affix my signature in presence of two witnesses.

HENRY W. GETMAN.

Witnesses:
HIRAM M. BURDICK,
JAS. H. TUTHILL.